(12) United States Patent
Iwamoto

(10) Patent No.: US 6,701,430 B1
(45) Date of Patent: Mar. 2, 2004

(54) COMMUNICATION SYSTEM, COMMUNICATION INITIALIZATION APPARATUS AND PROGRAM STORAGE MEDIUM

(75) Inventor: Koji Iwamoto, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/514,045

(22) Filed: Feb. 25, 2000

(30) Foreign Application Priority Data

Feb. 26, 1999 (JP) ............................. 11-049885

(51) Int. Cl.[7] ...................... G06F 15/177; G06F 1/12
(52) U.S. Cl. ................. 713/1; 710/9; 709/222; 165/209
(58) Field of Search .................. 713/1; 165/209; 62/175; 340/825.22; 710/220, 9; 709/222

(56) References Cited

U.S. PATENT DOCUMENTS 5,927,398 A * 7/1999 Maciulewicz ............... 165/209
5,980,078 A * 11/1999 Krivoshein et al. ............ 700/1
6,058,355 A * 5/2000 Ahmed et al. ................. 702/62

FOREIGN PATENT DOCUMENTS

JP          11-103309          4/1999

* cited by examiner

Primary Examiner—Thomas Lee
Assistant Examiner—Albert Wang
(74) Attorney, Agent, or Firm—RatnerPrestia

(57) ABSTRACT

The present invention discloses a structure which uses a communication system which comprises a communication initialization apparatus and communication terminals, such as an air conditioner and a humidifier, which mutually communicate with each other through a network. In the system, the communication initialization apparatus updates installation place information at predetermined timing and checks states of addresses of the communication terminals based on setting-regarding information which consists of the addresses of the communication terminals and equipment type information, whereby initial communication setting is updated. This allows communication between the communication terminals even when a communication terminal to communicate with is changed.

10 Claims, 11 Drawing Sheets

Fig. 5 (a)

| SEND-TO ADDRESS = COMUNICATION INITIALIZATION APPARATUS | SENT-FROM ADDRESS = PRELIMINARY ADDRESS ADDX | ADDRESS REQUEST COMMAND | SELF-IDENTIFYING EQUPMENT TYPE |
|---|---|---|---|

Fig. 5 (b)

| SEND-TO ADDRESS = ADD 2 | SENT-FROM ADDRESS = COMMUNICATION INITIALIZATION APPARATUS | EXISTENCE CONFIRM COMMAND | EQUIPMENT TYPE = HUMIDIFIER |
|---|---|---|---|

COMMUNICATION SYSTEM, COMMUNICATION INITIALIZATION APPARATUS AND PROGRAM STORAGE MEDIUM

BACKGROUND OF THE INVENTION

1. Field of the Invention

The present invention relates to communication terminals which communicate with each other through a network, a communication system which comprises a management apparatus for initializing communication terminals for communication, and a program storage medium.

2. Description of the Related Art

Communication terminals which are connected to a network and mutually communicate with each other, when set through communication initialization with information regarding a communication terminal of a communication partner to communicate with, can communicate with the communication partner. The information regarding the communication terminal of the communication partner as herein referred to includes an address which is used to specify the communication partner.

Now, as a conventional communication system, a system which comprises a first communication terminal and a second communication terminal which are operative in response to each other under a certain condition will be described.

FIG. 7 is a block diagram of a communication system which utilizes a conventional technique according to the example described above. As shown in FIG. 7, a communication system 7 is formed by an air conditioner 10 which is a first communication terminal comprising a humidity sensor 11, a humidifier 20 which is a second communication terminal, a communication initialization apparatus 30 which sets communication initialization information to these communication terminals, and a network 40 which connects these elements. The communication initialization apparatus 30, the air conditioner 10 which a communication terminal and the humidifier 20 which is another communication terminal each comprise communication means 50 which allows mutual communication through the network 40, self-regarding information holding means 51 which holds communication initialization information regarding the terminal or the apparatus itself, and partner information holding means 52 which holds communication initialization information regarding a communication partner.

Having such structures, the air conditioner 10 and the humidifier 20 are capable of operating in a mutually responsive manner such that the humidifier 20 starts operating, when the humidity sensor 11 of the air conditioner 10 indicates a value below a predetermined value.

Meanwhile, the communication initialization apparatus 30 comprises communication initialization means 53 and address holding means 54 which holds an address which is set by the communication initialization means 53. The air conditioner 10 comprises first control means 12 which instructs, using the communication means 50, the humidifier 20 to start operating when the humidity sensor 11 indicates a value below the predetermined value. The humidifier 20 comprises second control means 22 which starts operating in response to an instruction given from the first control means 12.

Operations of the conventional communication system which is structured as described above will now be described in the following.

First, an initial state is that in the air conditioner 10 and the humidifier 20, the self-regarding information holding means 51 holds self-identifying model type information which is set at the time of shipping and a preliminary initial address ADDX, while the partner information holding means 52 does not hold any information yet. As herein referred to, the "self-identifying model type information" is information regarding model types such as air conditioners and humidifiers.

On the other hand, in the communication initialization apparatus 30, the self-regarding information holding means 51 holds self-identifying model type information which is set at the time of shipping and an official address ADD0 of the communication initialization apparatus 30 itself, while the address holding means 54 holds yet-to-set addresses which are set to the respective communication terminals to communicate with and information which is used to confirm whether the yet-to-set addresses are set to the respective communication terminals. As herein described, as the yet-to-set addresses, two addresses ADD1 and ADD2 are held.

Now, a description will be given on operations of communication initialization for enabling the communication terminals communicable with each other. FIG. 8 is a flowchart showing an operation sequence of communication initialization in the communication system 7. As shown in FIG. 8, the operations of communication initialization consist of three processes, that is, to set the respective communication terminals with official addresses (step 100), to acquire equipment information regarding the respective communication terminals (step 200) and to set the respective communication terminals with the partner information (step 300). In the following, the operations will be described in relation to each step.

First, an operation sequence at the step 100 in the respective communication terminals and the communication initialization apparatus will be described with reference to FIG. 9. FIG. 9 shows a specific communication sequence between the communication initialization apparatus 30, the air conditioner 10 and the humidifier 20 at the step 100.

At a first stage, using the preliminary address ADDX which is held in the self-regarding information holding means 51 and the address ADD0 which is held in the self-regarding information holding means 51 of the communication initialization apparatus 30, the communication means 50 of each one of the air conditioner 10 and the humidifier 20 which are communication terminals communicates with the communication initialization apparatus 30, and requests for an official address.

Next, upon receipt of the requests for the official addresses, the communication initialization means 53 of the communication initialization apparatus 30 notifies, as official addresses, the communication terminals which issued the requests of the yet-to-set addresses which are held in the address holding means 54. As herein described, as the official addresses, the communication initialization means 53 notifies the air conditioner 10 of ADD1 and the humidifier 20 of ADD2. In other words, the communication initialization apparatus 30 sets ADD1 to the air conditioner 10 and ADD2 to the humidifier 20 as the official addresses.

Notified of the official addresses by the communication initialization apparatus 30, the air conditioner 10 and the humidifier 20 hold the official addresses in their self-regarding information holding means 51 as their own self-defining official addresses. This completes setting of the official addresses to the air conditioner 10 and the humidifier 20.

Second, an operation sequence at the step 200 in the respective communication terminals and the communication initialization apparatus will be described with reference to FIG. 10. FIG. 10 shows a specific communication sequence between the communication initialization apparatus 30, the air conditioner 10 and the humidifier 20 at the step 200.

At a first stage, using the official addresses which are set at the precedent step 100, the communication means 50 of the communication initialization apparatus 30 communicates with the respective communication terminals and requests for the equipment information which are held by the respective communication terminals.

Assuming that the communication initialization apparatus 30 issues an equipment information request first to the communication terminal which holds ADD1, since the communication terminal in which ADD1 is set as the official address is the air conditioner 10, the equipment information request is sent to the air conditioner 10.

Upon receipt of the equipment information request above, the air conditioner 10 notifies the communication initialization apparatus 30 of the equipment information which is one of self-regarding information held in the self-regarding information holding means 52 and which denotes among other things that the self-identifying model type is air conditioners.

The communication initialization apparatus 30, receiving the equipment information from the air conditioner 10, holds the equipment information in the partner information holding means 52 as information to be paired with ADD1.

Next, a similar operation to the above is performed on the humidifier 20 which is a communication terminal which holds ADD2. The communication initialization apparatus 30 holds, in the partner information holding means 52, equipment information regarding the humidifier 20 which is a communication terminal which has ADD2, as information to be paired with ADD2. This completes operations performed by the communication initialization apparatus for acquiring the equipment information regarding the respective communication terminals.

At last, a description will be given on an operation sequence at the step 300 in the respective communication terminals and the communication initialization apparatus with reference to FIG. 11. FIG. 11 shows a specific communication sequence between the communication initialization apparatus 30, the air conditioner 10 and the humidifier 20 at the step 300.

First, a case will be assumed where the first control means 12 of the air conditioner 10 is to operate in response to the humidifier. With the communication system 7 in the current state (at completion of the step 200), however, since the partner information holding means 52 of neither the air conditioner 10 nor the humidifier 20 holds any information, the air conditioner 10 and the humidifier 20 can not mutually communicate with each other.

In this case, the air conditioner 10 communicates with the communication initialization apparatus 30 and requests for the address of the communication terminal whose equipment information denotes that the equipment is a humidifier.

Receiving the address request above, the communication initialization apparatus 30 searches information which is held in the partner information holding means 52. Since ADD2 is the address of the communication terminal whose equipment information denotes that the equipment is a humidifier at present, the communication initialization apparatus 30, upon discovery of this, returns a reply to the air conditioner 10 and notifies the air conditioner 10 of the fact that the address of the communication terminal satisfying the request is ADD2.

The air conditioner 10 receives the reply and holds ADD2 in its partner information holding means 52 as the address of the humidifier.

On the other hand, in parallel with the operation above, the communication initialization apparatus 30 communicates with the humidifier 20, and the humidifier 20 holds ADD1 in its partner information holding means 52 as the address of the air conditioner. This completes setting of the partner information to the partner information holding means 52 of the air conditioner 10 and the humidifier 20 and terminates communication initialization of the communication system 7 as a whole.

With communication initialization completed, the air conditioner 10 and the humidifier 20 are capable of communicating with each other. Hence, it is now possible to have the communication terminals to operate in response to each other such that, for example, when a value indicated by the humidity sensor 11 of the air conditioner 10 becomes equal to or smaller than a certain value, the first control means 12 orders the humidifier 20 to start operating.

A conventional communication system is as described above. However, with such a conventional communication system, problems as described below may occur if the configuration of the system is changed after initializing the system once.

For instance, a consideration will be given to a situation where the humidifier 20 is disconnected from the network 40 and a second humidifier is newly installed. In this case, while the second humidifier as well must be initialized for communication in the same sequence as that described in relation to the conventional technique above, the partner information holding means 52 of the communication initialization apparatus 30 still holds the official address ADD2, which was assigned to the humidifier 20, together with the equipment information on the humidifier 20 as paired information, even after the humidifier 20 is disconnected from the network. Hence, it is not possible to assign ADD2 as an address for the second humidifier.

It then follows that unless the address holding means 54 of the communication initialization apparatus 30 holds an extra yet-to-set address, the communication initialization apparatus 30 can not assign an official address to the second humidifier at all. In other words, when the address holding means 54 of the communication initialization apparatus 30 does not hold a yet-to-set address, it is not possible to assign an official address to a communication terminal which is newly installed, which is a first problem.

Further, even when the address holding means 54 holds a sufficient number of yet-to-set addresses and it is possible to set a new official address to the second humidifier, since it is ADD2 which is the address of the old humidifier 20 that the partner information holding means of the air conditioner 10 which is to communicate with the second humidifier holds, the air conditioner 10 nevertheless remains incapable of communicating with the newly disposed second humidifier.

SUMMARY OF THE INVENTION

The present invention has been made to solve the problems described above. Accordingly, an object of the present invention is to provide a communication system, a communication initialization apparatus and a program storage medium with which it is possible to efficiently assign addresses to terminals and ensure communication between the terminals even when a change is made to connection between the terminals or the terminals themselves.

The first invention of the present invention is a communication system, comprising:

a bus for transmission of data;

a plurality of terminals connected to said bus, said plurality of terminals each including first information which contains at least an ID; and communication initialization means which is connected to said bus and sets at least addresses to said plurality of terminals, wherein said communication initialization means comprises:

setting-regarding information holding means which holds setting-regarding information which represents correlation between said set addresses and said terminals; and setting/confirming means which checks said first information of each one of said terminals at predetermined timing, judges whether a correct terminal based on said setting-regarding information exists every time said timing comes, and updates said setting-regarding information in accordance with a result of judgement.

The second invention of the present invention is a communication system according to the first invention, wherein said information which contains at least said IDs contains inherent information which is inherent in said terminals.

The third invention of the present invention is a communication system according to the first or second invention, wherein all or part of said terminals are capable of communicating with other terminals through said bus.

The fourth invention of the present invention is a communication system according to any one of the $1^{st}$ through $3^{rd}$ present inventions, wherein said communication initialization means transmits installation places of said terminals to said terminals as installation place information every time said timing comes before said updating, and said terminals each judge upon receipt of said installation place information whether said installation place information which is received this time matches with installation place information which was received last time, and when the terminal judges the both installation place information are not equal to each other, said installation place information received this time is set as new installation place information.

The $5^{th}$ invention of the present invention is a communication system according to the $3^{rd}$ invention, wherein a terminal to be updated as to at least said setting-regarding information requests said communication initialization means for transmission of address information regarding a terminal which is to serve as a communication partner, and said communication system comprises attendant-on-equipment information holding means which holds an address which is transmitted in response to the request as new partner information.

The $6^{th}$ invention of the present invention is a communication system according to the $3^{rd}$ invention, wherein when said setting-regarding information is updated, said communication initialization means transmits an address of a terminal which is to serve as a communication partner to a terminal which is relevant to the update of said setting-regarding information, based on said setting-regarding information which is updated.

The $7^{th}$ invention of the present invention is a communication initialization apparatus for setting at least addresses to a plurality of terminals which are connected to a bus for transmission of data and which include first information which contains at least ID, said communication initialization apparatus comprising:

a setting-regarding information holding part which holds setting-regarding information which represents correlation between said set addresses and said terminals; and a setting/confirming part which checks said first information of each one of said terminals at predetermined timing, judges whether a correct terminal based on said setting-regarding information exists every time said timing comes, and updates said setting-regarding information in accordance with a result of the judgement.

The $8^{th}$ invention of the present invention is a program storage medium for recording a program and/or data for executing all or some of the functions of all or some of said means described in any one of the $1^{st}$ through $7^{th}$ inventions, said program storage medium being readable by a computer.

BRIEF DESCRIPTION OF THE DRAWINGS

FIG. 5 (a) is a diagram showing a format of a communication packet of an address request issued by a communication terminal of the communication system according to the present invention;

FIG. 5 (b) is a diagram showing a format of a communication packet which is used by the communication initialization apparatus of the communication system according to the present invention so as to confirm existence of equipment;

DESCRIPTION OF THE PREFERRED EMBODIMENTS

Figure 1:
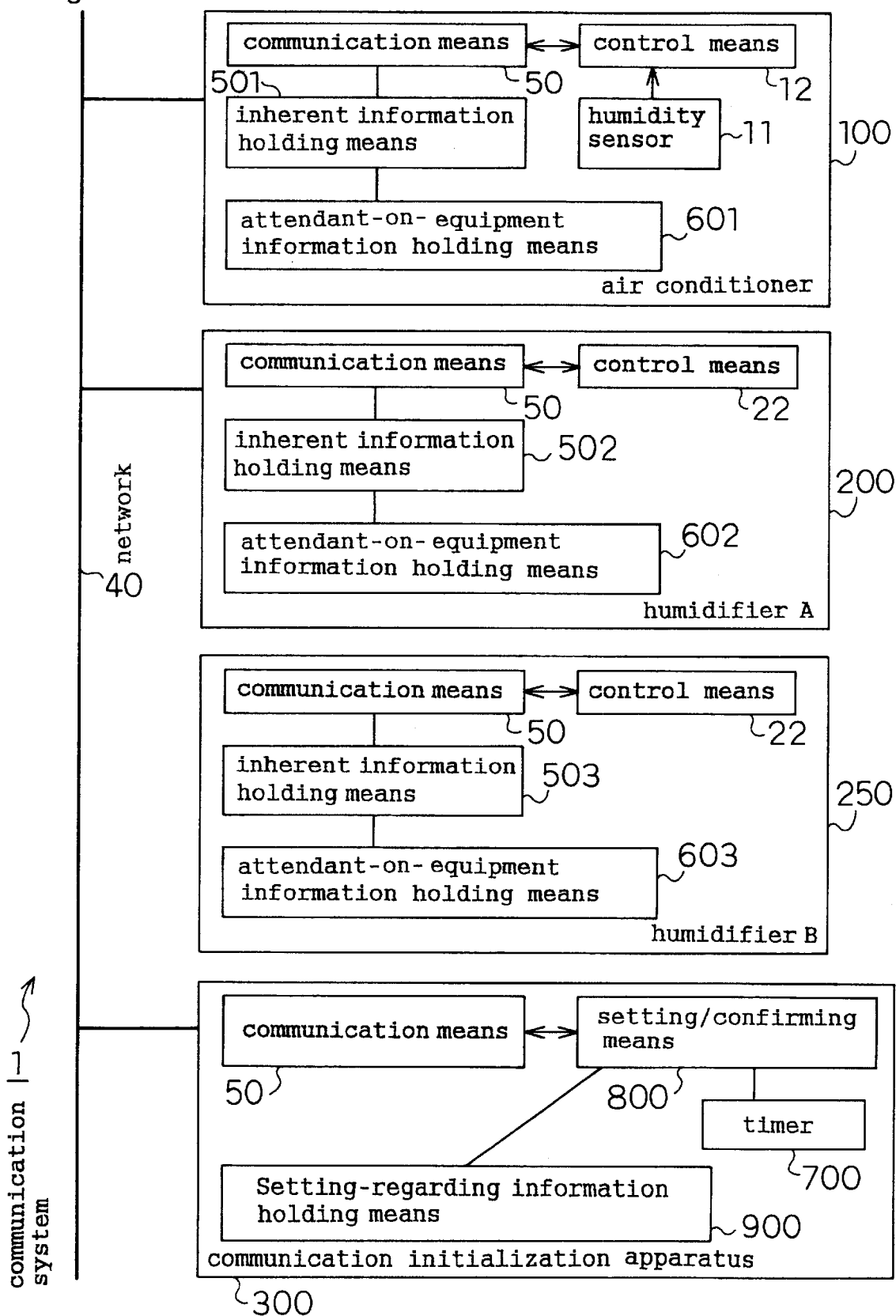
FIG. 1 is a diagram showing a structure of a communication system according to the present invention.

FIG. 1 is a diagram showing a structure of a communication system according to a preferred embodiment of the present invention.

Figure 7:
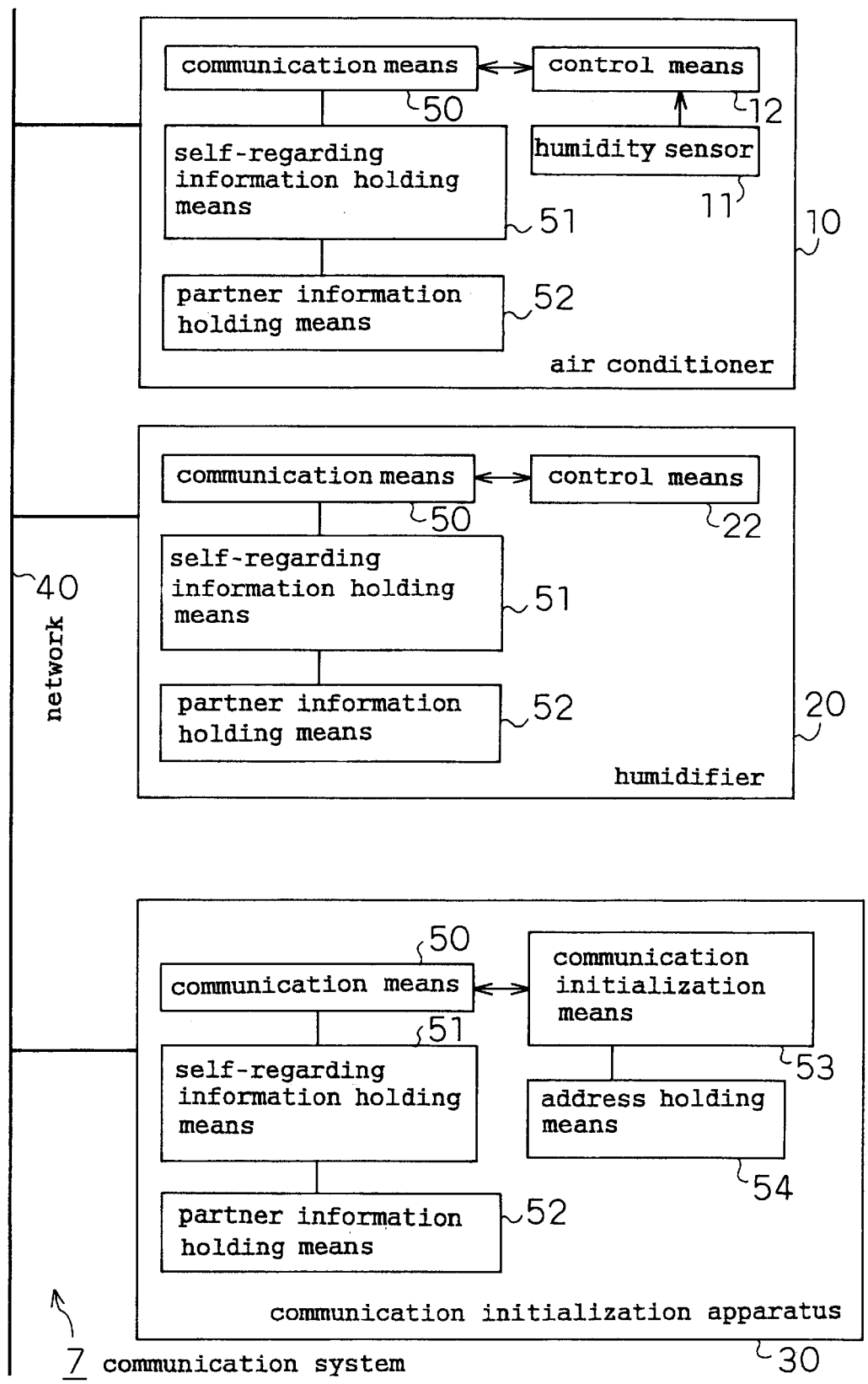
FIG. 7 is a diagram showing a structure of a conventional communication system.
Figure 8:
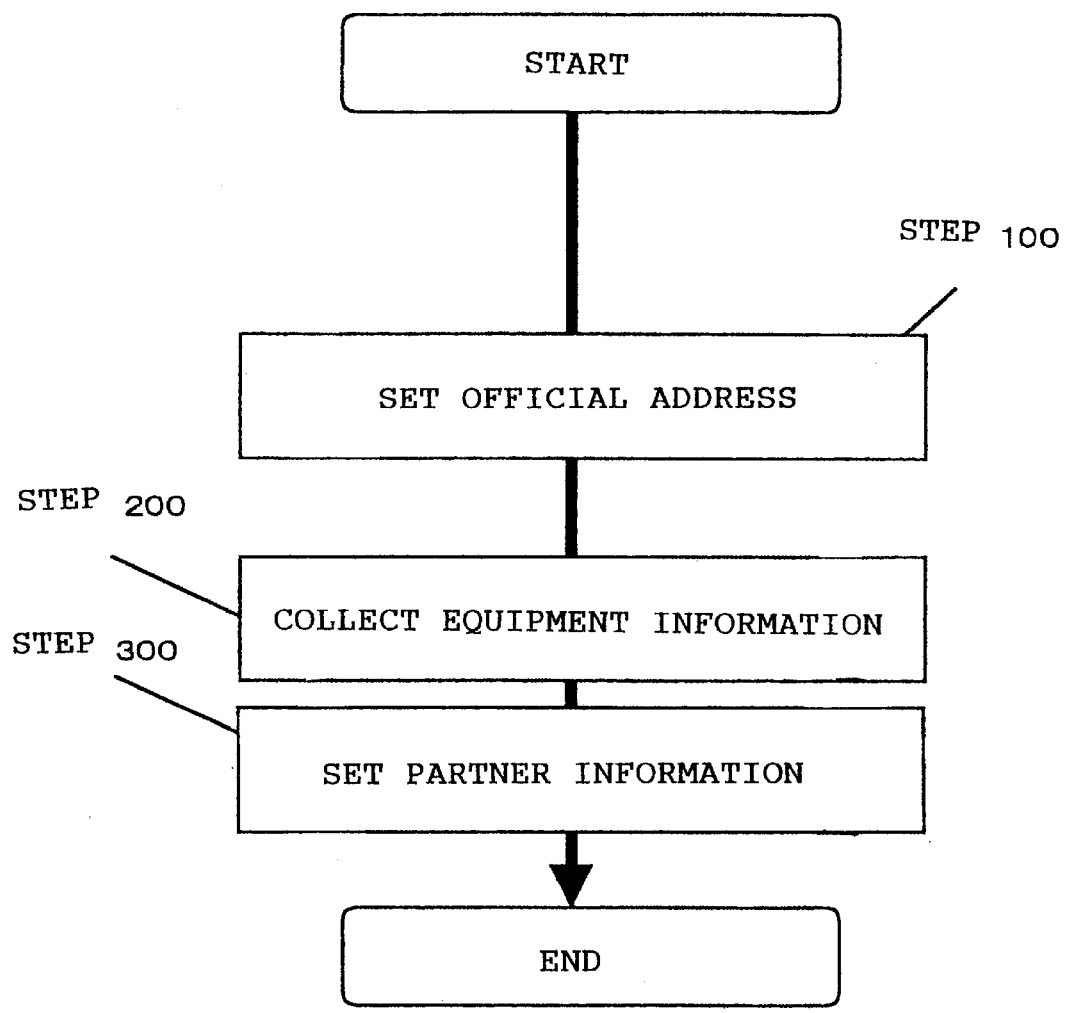
FIG. 8 is a flowchart showing a communication sequence in the conventional communication system.
Figure 9:
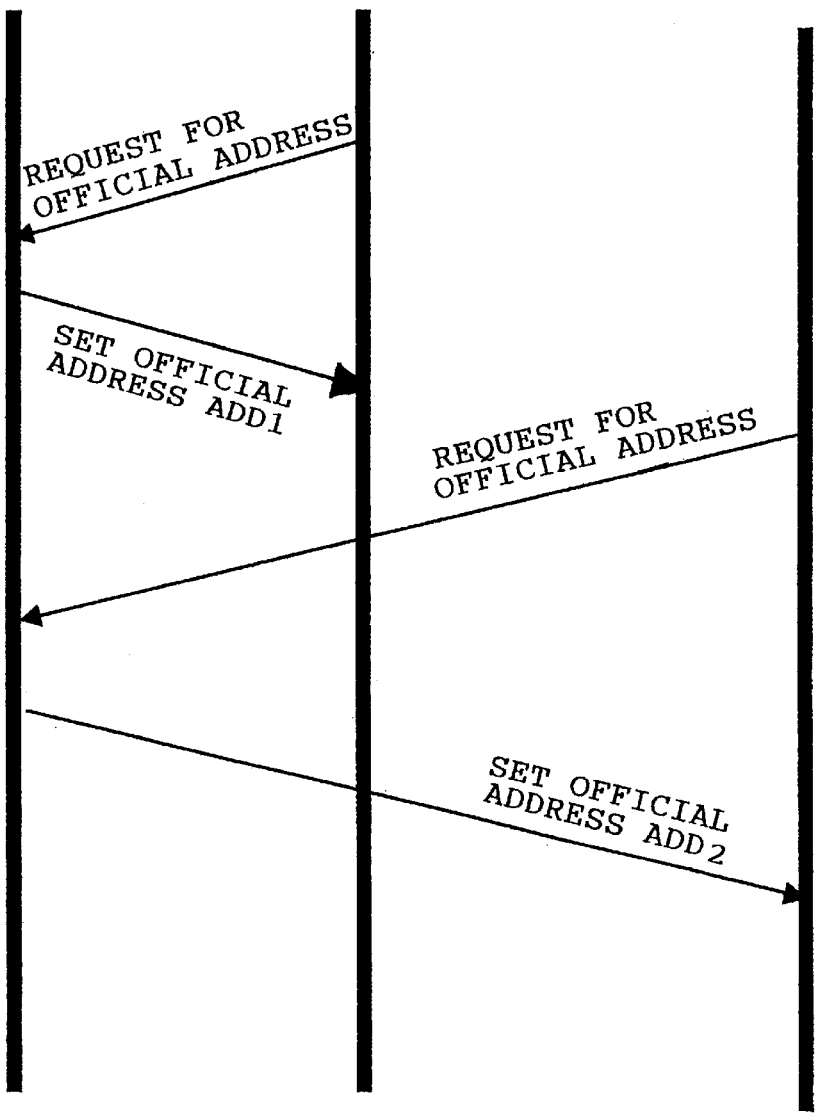
FIG. 9 is a diagram showing a communication sequence of setting an official address in the conventional communication system.
Figure 10:
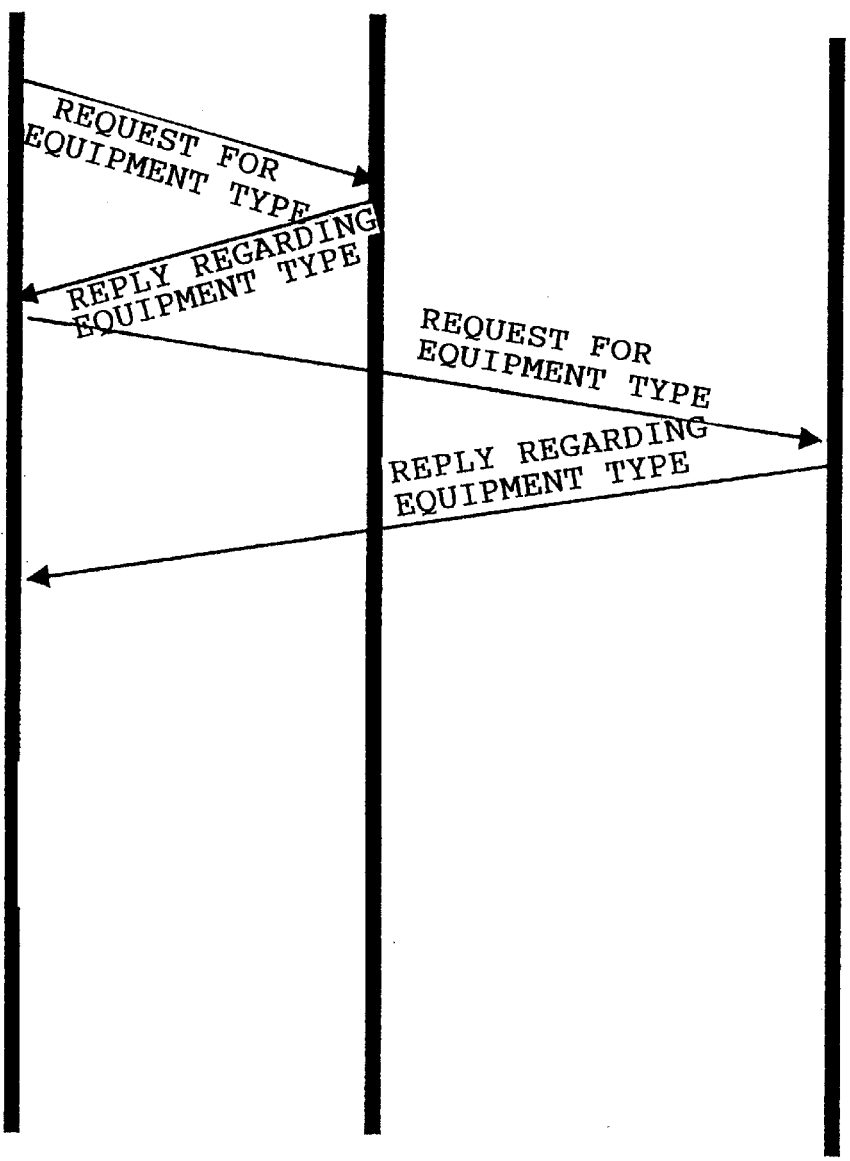
FIG. 10 is a diagram showing a communication sequence of collecting equipment information in the conventional communication system.
Figure 11:
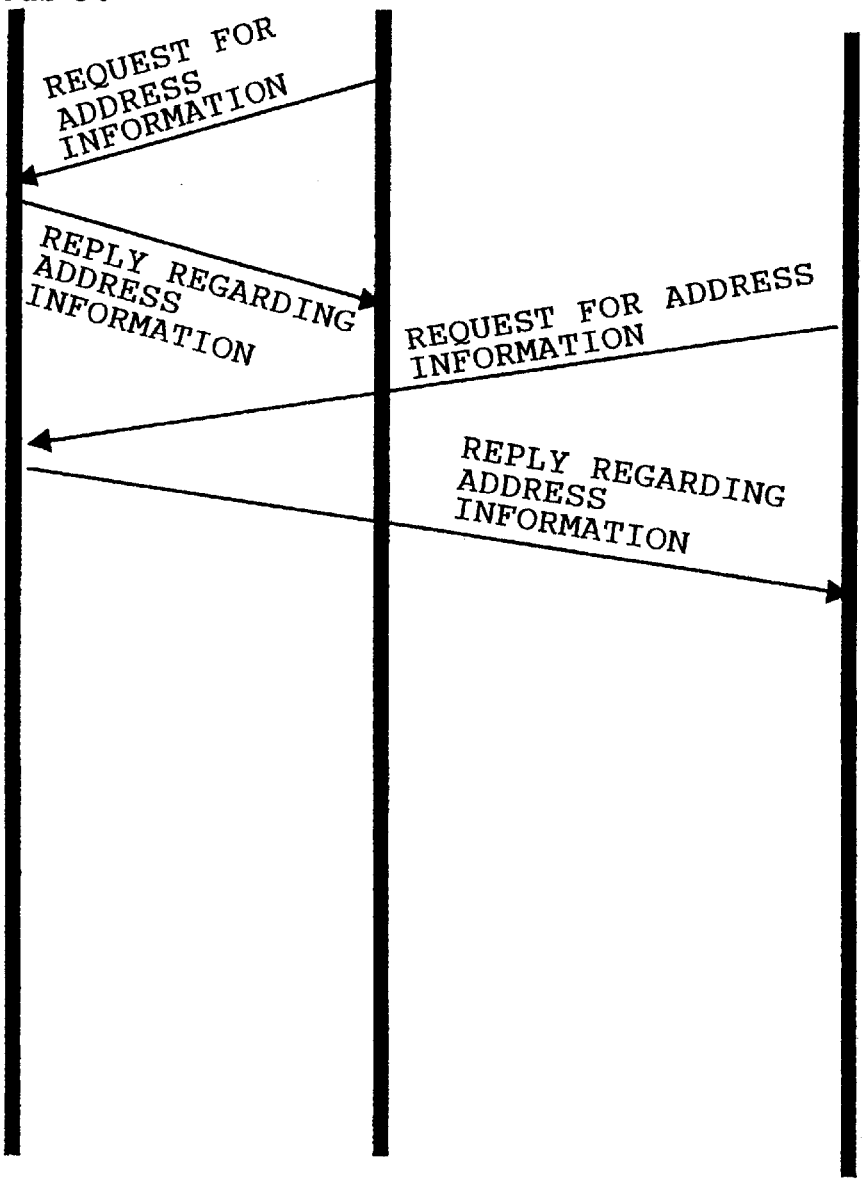
FIG. 11 is a diagram showing a communication sequence of setting partner information in the conventional communication system.

As shown in FIG. 1, in a communication system 1, denoted at the same names or reference symbols as those in FIG. 7 are same portions as FIG. 7. An air conditioner 100, a humidifier A200 and a humidifier B250 are means which can serve as one of communication terminals. A communication initialization apparatus 300 is means for performing initialization and updating setting-regarding information as described later.

Further, in the communication initialization apparatus 300, a timer 700 is means for operating setting/confirming means 800 for every certain period (Ta), and the setting/confirming means 800 is means which operates under the control of the timer 700. Setting-regarding information holding means 900 is means for setting yet-to-set addresses which the setting/confirming means 800 uses for communication initialization, setting equipment type information which is indicative of equipment types of communication terminals and the yet-to-set addresses above (or already-set addresses) as pairs of information, and holding installation place information which is information indicating places where the communication system 1, the network 40, and all or some of the communication terminals are disposed.

In the air conditioner 100, the humidifier A200 and the humidifier B250, inherent information holding means 501 is means for holding information (i.e. inherent-in-equipment information) which is inherent in the equipment including the equipment type information regarding the respective communication terminals, while attendant-on-equipment information holding means 601 is means for holding information, such as official addresses, information regarding communication partners and installation place information, which is supplied by the communication initialization apparatus at the time of communication initialization.

As herein termed, an "ID" of the present invention refers to a concept corresponding to the inherent-in-equipment information or the like described above. And also, "first information" of the present invention corresponding to the information including at lease the inherent-in-equipment information.

Figure 2:
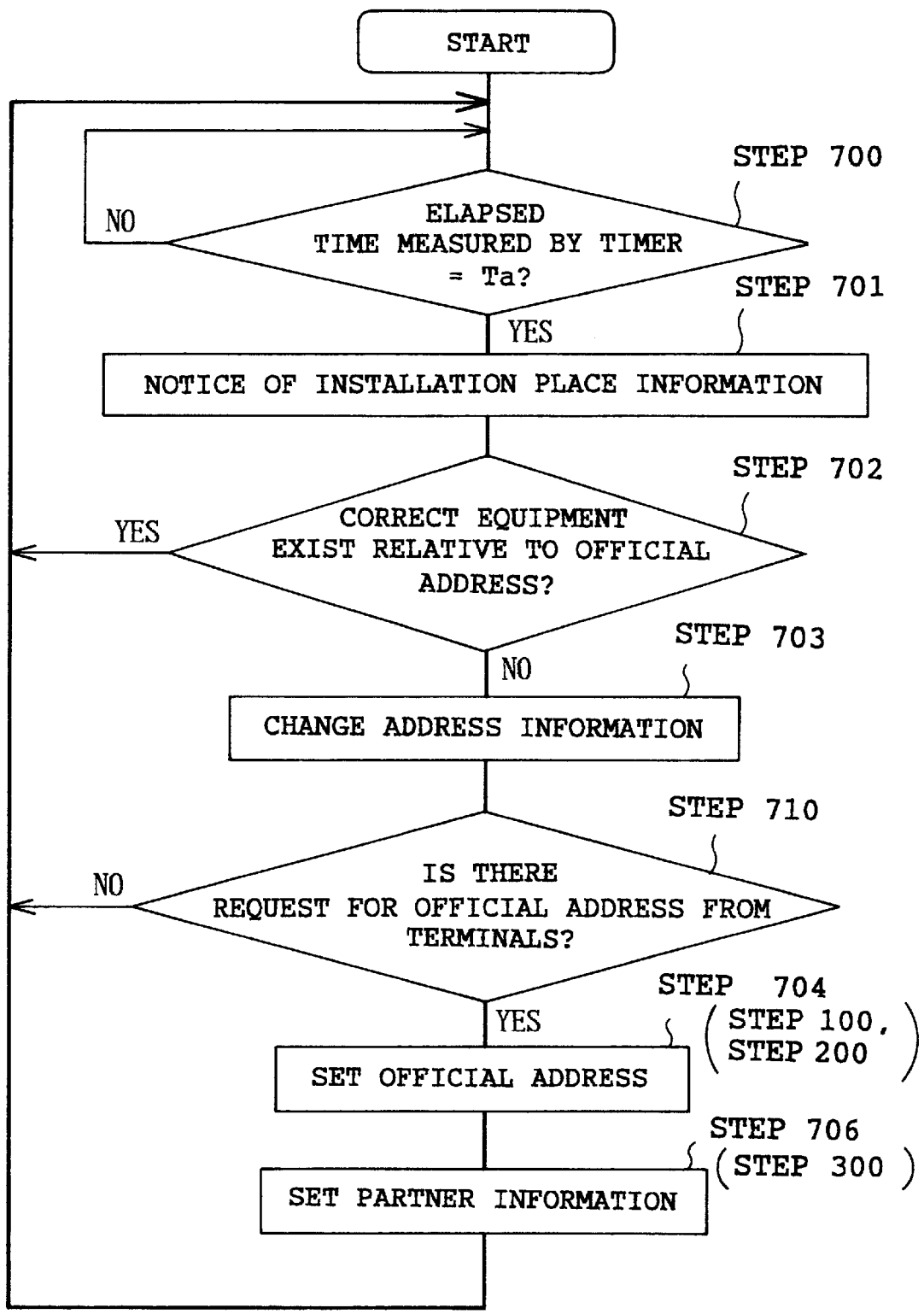
FIG. 2 is a flowchart showing a processing sequence in a communication initialization apparatus of the communication system according to the present invention.
Figure 3:
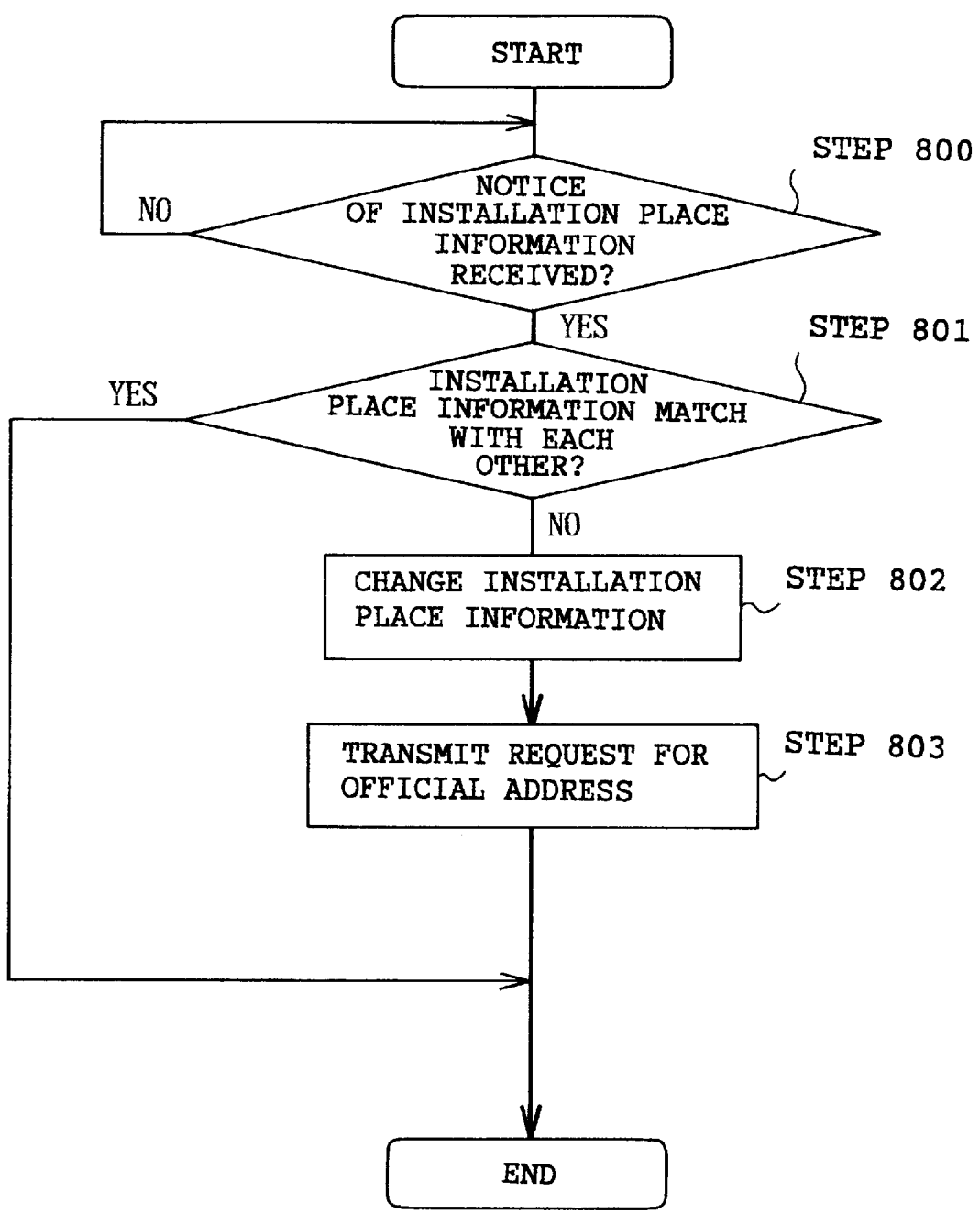
FIG. 3 is a flowchart showing a processing sequence in a communication terminal of the communication system according to the present invention.

FIG. 2 is a flowchart showing an operation sequence in the communication initialization apparatus 300 according to the present invention. FIG. 3 is a flowchart showing a general processing sequence related to receipt and transmission of an installation place notice the communication initialization apparatus 300 periodically issues to the communication terminals, such as the air conditioner 100, the humidifier A200 and the humidifier B250, which communicate with each other on the network 40 in the communication system 1 according to the present invention shown in FIG. 3.

Now, general operations of the communication system 1 according to the present invention which has such a structure as described above will be described in the following. For the simplicity of description, it is assumed in the following that the respective communication terminals and the communication initialization apparatus are already in a communicable state.

First, operations of the communication initialization apparatus 300 will be described with reference to FIG. 2.

At a step 700, when judging that an operation cycle, namely, a certain period Ta has passed, the timer 700 sets the setting/confirming means 800 to perform initialization.

Next, at a step 701, the setting/confirming means 800 notifies the communication terminals on the network of installation place information.

At a step 702, based on setting-regarding information which is already set, the setting/confirming means 800 communicates so as to confirm that communication terminals exist relative to the official addresses described above, which are held by the setting-regarding information holding means 900, using attendant-on-equipment information regarding the respective communication terminals. When the existence of communication terminals which bear the setting-regarding information based on the setting-regarding information fails to be confirmed as a result of this despite a fact that the official addresses are already assigned, the communication initialization apparatus 300 proceeds to a step 703 and the operation is continued. When the existence of correct communication terminals which correspond to all of the official addresses is confirmed as defined in the setting-regarding information, the communication initialization apparatus 300, determining that there is no change to the configuration of the communication system 1, returns to the operation at the step 700.

At the step 703, the setting/confirming means 800 changes an official address which is held by the setting-regarding information holding means 900 but is assigned to a communication terminal which does not exist on the network 40 in reality to a yet-to-set address.

At a step 710, whether there is a request for setting of an official address issued from the communication terminals is judged. When there is no such request, the communication initialization apparatus 300 returns to the immediately precedent state to the step 700. When there is such a request, the communication initialization apparatus 300 proceeds to a step 704.

With respect to operations after the step 704, an operation at the step 704 is similar to the operation at the step 100 of setting the addresses described earlier in relation to conventional techniques and the operation at the step 200 of collecting the equipment information, and an operation at the step 706 is similar to the operation at the conventional step 300 of setting partner information. Hence, the similar operations will not be described again.

Next, general operations of the communication terminals will be described with reference to FIG. 3.

First, at a step 800, the control means of the respective communication terminals receive the installation place information which is contained in the notice which is issued by the communication initialization apparatus 300 for every certain cycle Ta. When the control means fail to receive the installation place information, the respective communication terminals return to a stand-by state of waiting for the installation place information.

Next, at a step 801, the communication terminals compare the installation place information which is held by their own attendant-on-equipment information holding means with new installation place information which is newly received at the step 800. When the two installation place information match with each other as a result of the comparison, the communication terminals finish the operation. When the two information do not coincide with each other (including when there is no installation place information defined from the beginning) the communication terminals proceed to a step 802 and operate accordingly.

At the step 802, the communication terminals rewrite the installation place information which is held by their own attendant-on-equipment information holding means into the newly received installation place information, so that the rewritten installation place information matches with the installation place information which is held by the communication initialization apparatus 300.

Further, at a step 803, the communication terminals request the communication initialization apparatus 300 for official addresses and thereafter communicate with the communication initialization apparatus 300, whereby initialization is completed. As described in detail specifically later, when the communication initialization apparatus 300 receives the official address request above, the sequence returns to the immediately precedent state to the step 710 which is shown in FIG. 2, and the processing at the steps 704 and 706 is executed.

Now, a description will be given on more specific operations of communication initialization in a case that model type changes are made to the air conditioner 100, the humidifier A200 and the humidifier B250 which are shown in FIG. 1, based on the general operations described above.

First, as an initialization condition for starting the operations, it is assumed that the air conditioner 100 and the humidifier A200 which are both communication terminals are connected with the communication initialization apparatus 300 via the network 40 but are not in a mutually communicable state while the humidifier B250 is not connected to the network.

States of the respective communication terminals and the communication initialization apparatus under the condition above will be described. The inherent information holding means 501 of the air conditioner 100 holds the equipment type information "air conditioner" as one of inherent information. The attendant-on-equipment information holding means 601 holds the preliminary address ADDX as its self-address, but a "not yet defined" state as the partner information and the installation place information.

Inherent information holding means 502 of the humidifier A200 holds the equipment type information "humidifier" as one of inherent information. Attendant-on-equipment information holding means 602 holds the preliminary address ADDX as its self-address, but a "not yet defined" state as the partner information and the installation place information.

Inherent information holding means 503 of the humidifier B250 which is not connected to the network 40 holds the equipment type information "humidifier" as one of inherent information. Attendant-on-equipment information holding means 603 holds the preliminary address ADDX as its self-address, but a "not yet defined" state as the partner information and the installation place information.

On the other hand, the setting-regarding information holding means 900 of the communication initialization apparatus 300 holds the address ADD0 as its self-address, and two addresses ADD1 and ADD2 as yet-to-set addresses.

The setting-regarding information holding means 900 further holds combination of the yet-to-set address ADD1 and the equipment type information "air conditioner," combination of the yet-to-set address ADD2 and the equipment type information "humidifier" as the setting-regarding information and installation place information "Mr. A's house."

Now, a brief description will be given on a situation that the setting-regarding information is already stored in the setting-regarding information holding means 900 as described immediately above although official addresses are not specifically assigned to the communication terminals.

The communication initialization apparatus 300 according to the preferred embodiment of the present invention specifically corresponds to an air conditioning control apparatus of an air conditioning system. An air conditioning control apparatus as above has from the beginning a function of controlling an air conditioner and a humidifier in a mutually responsive manner. Hence, it is possible to store the setting-regarding information about addresses corresponding to assumed connection between the terminal apparatuses, before the air conditioner, the humidifier and the like are connected in reality as communication terminals.

Figure 4:
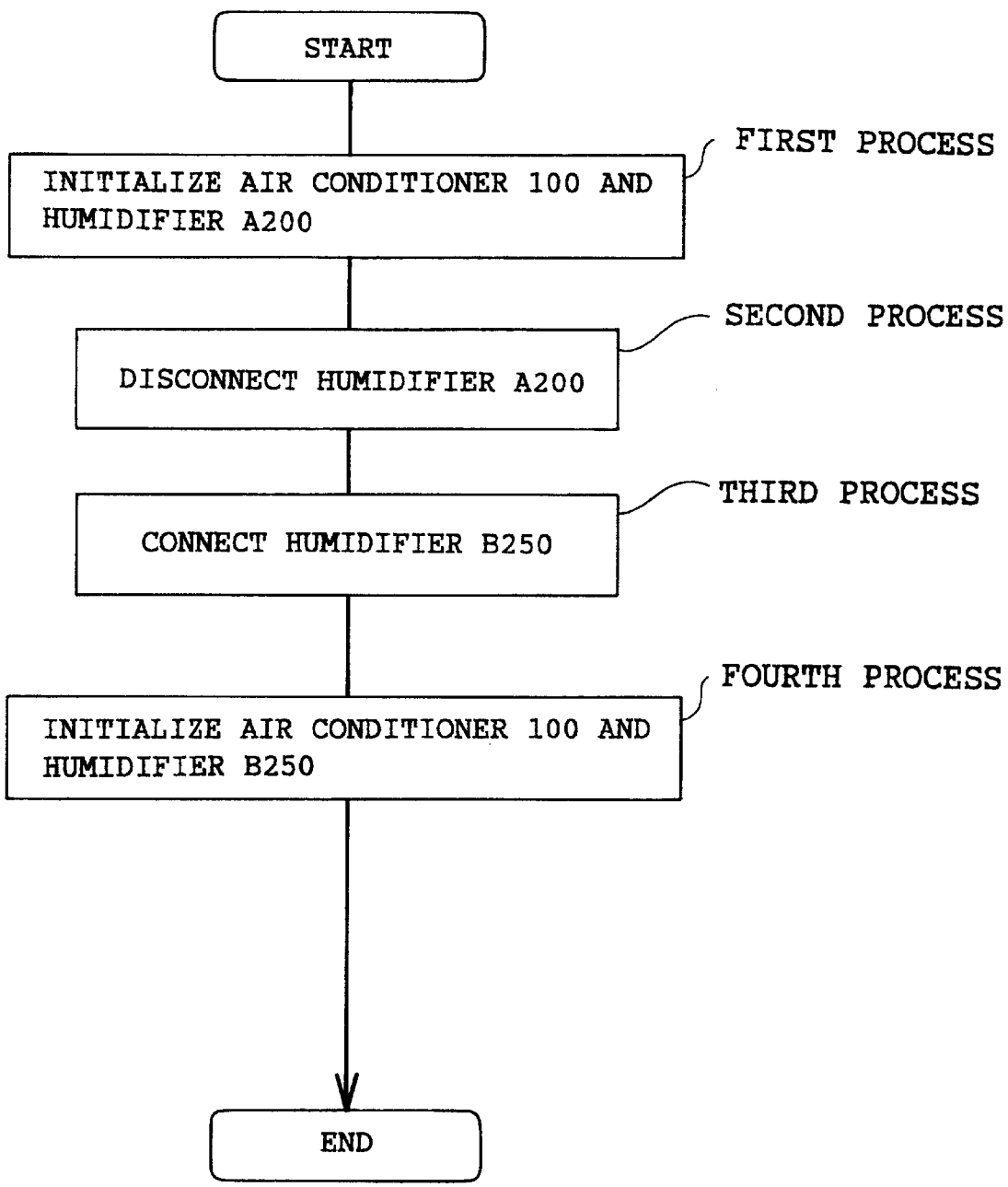
FIG. 4 is a flowchart showing an overall flow of communication initialization in the communication system according to the present invention.

Under the condition described earlier, operations of communication initialization in the communication system 1 according to the present invention are performed in a sequence shown in the flowchart in FIG. 4. As shown in FIG. 4, initialization consists mainly of four processes, namely, a process of executing communication initialization for the air conditioner and the first humidifier (first process), a process of disconnecting the humidifier A200 from the network (second process), a process of connecting the humidifier B250 with the network to change the setting (third process), and a process of executing communication initialization once again for the air conditioner and the humidifier B250 (fourth process). In the following, each one of the processes will be described.

In the first process, as shown in the flowchart in FIG. 2 earlier, when an elapsed time measured by the timer 700 becomes equal to Ta (step 700), the communication initialization apparatus 300 notifies on the network 40 of "Mr. A's house" which is the installation place information held by the communication initialization apparatus 300 (step 701). The communication initialization apparatus 300 is not related to whether there are replies from the terminals at the step 701 in response to the notice.

Meanwhile, the air conditioner 100 receives the installation place information "Mr. A's house" described above (step 800).

Since the installation place information held by the attendant-on-equipment information holding means 601 of the air conditioner 100 represents "not yet defined" at this stage which is different from the installation place information "Mr. A's house" received from the communication initialization apparatus 300, the installation place information is updated (steps 801, 802).

Next, the air conditioner 100 requests the communication initialization apparatus 300 for an official address (step 803).

Receiving the request for official address above, the communication initialization apparatus 300 is controlled such that the processing jumps to the immediately precedent state to the step 710 which is shown in FIG. 2.

This allows setting of the official address (step 704) and setting of partner information (step 706) to be executed in a similar manner to that described above. However, the inherent information holding means 501 holds the information inherent in the equipment such as the equipment type information, and the equipment type information is attached to the communicated official address request. FIG. 5(a) shows a format of a communication packet which is transmitted by the communication terminal. The humidifier A200 as well is initialized through similar processing to that performed on the air conditioner 100.

Because of the operations above, the self-address held by first attendant-on-equipment information holding means 601 of the air conditioner 100 is the official address ADD1, the partner information is ADD2, and the installation place information is "Mr. A's house," while the self-address held by second attendant-on-equipment information holding means 602 of the humidifier A200 is the official address ADD2, the partner information is ADD1, and the installation place information is "Mr. A's house." Further, the setting-regarding information holding means 900 of the communication initialization apparatus 300 holds that the official address ADD1 is set to the air conditioner and the official address ADD2 is set to the humidifier. Now that the communication initialization for the air conditioner 100 and the humidifier A200 is completed, the air conditioner 100 and the humidifier A200 can communicate with each other.

While the processing returns to the immediately precedent state to the step 700 and shifts to the steps 800, 801 through the step 701 after the processing at the step 706 completes, since there is no change to the installation of the respective communication terminals at the step 801, the process of requesting for official addresses (step 803) is not performed.

Meanwhile, since the result of judgement at the step 702 is YES in the communication initialization apparatus 300, the processing returns to the immediately precedent state to the step 700 once again and the series of operations is repeated.

Next, in the second process, the humidifier A200 is disconnected from the network 40. Although the partner information held by the first attendant-on-equipment information holding means 601 of the air conditioner 100 is still the official address ADD2 in this condition, since the humidifier A200 which corresponds to the address ADD2 does not exist on the network 40, the air conditioner 100 can not communicate with the humidifier.

After the next period Ta elapses as measured by the timer 700, the communication initialization apparatus 300 issues on the network 40 a notice regarding the installation place information once again (steps 700, 701).

Following this, the communication initialization apparatus 300 confirms existence of equipment whose address is ADD2 and whose equipment type information obtained from the inherent information is "humidifier" (step 702). FIG. 5(b) shows a format of a communication packet which is used by the communication initialization apparatus 300 for the confirmation.

The communication initialization apparatus 300 confirms, in a similar manner to the above, whether correct equipment exists against the official address ADD1 as well to which the air conditioner 100 is connected. That is, the communication initialization apparatus 300 performs the confirmation described above on all the communication terminals to which official addresses are assigned.

Since the humidifier A200 whose official address is ADD2 is already off the network 40 and accordingly unresponsive, the information denoting that "ADD2 is an official address which is paired with 'humidifier'" held in the setting-regarding information holding means 900 is changed to information denoting that "ADD2 is a yet-to-set address which is paired with 'humidifier'" (step 703). The change like this to the setting-regarding information is an example of updating of the setting-regarding information according to the present invention.

Since an official address which is not associated with a communication terminal is changed to a yet-to-set address through the operations described above, shortage of yet-to-set addresses held by the setting-regarding information holding means 900 is avoided.

While the description immediately above is an example where there is no communication terminal which corresponds to the official address ADD2, as described earlier, since communication initialization holding means of the communication initialization apparatus 300 confirms based on the setting-regarding information equipment types at the same time which are obtainable from the inherent information, even when an address of a communication terminal other than the humidifier A200 is recognized as the official address ADD2 on the network 40 for some reason, a fact that there is no correct communication terminal (which is the humidifier A200) is confirmed in accordance with the setting-regarding information and the official address ADD2 is nevertheless changed to a yet-to-set address.

Next, the sequence proceeds to the step 710. Judging that there is no request for official address issued by the communication terminals, the processing returns to the immediately precedent state to the step 700.

In the third process, the humidifier B250 is connected to the network 40 at a place where the humidifier A200 used to be connected to the network 40. At this stage, since the self-address held by third attendant-on-equipment information holding means 603 of the humidifier B250 is the preliminary address ADDX and the partner information and the installation place information are not defined yet, the air conditioner 100 can not communicate with the humidifier whose address is ADD2.

Lastly, in the fourth process, after the period Ta elapses again as measured by the timer 700, the communication initialization apparatus 300 issues on the network 40 a notice regarding the information "Mr. A's house" as the installation place information (steps 700, 701).

On the other hand, in response to the notice above, the humidifier B250 receives the installation place information as in the case where the humidifier A200 is connected to the network 40. After the processing at the steps 801 and 802, the humidifier B250 requests the communication initialization apparatus 300 for an official address as at the step 803. A packet of the address request, as shown in the format in FIG. 5(b), contains in advance a piece of information denoting that the equipment type information is "humidifier" as one of the inherent information.

Further, upon receipt of the packet of the address request above from the humidifier B250, the communication initialization apparatus 300 returns to the immediately precedent state to the step 710 as described earlier and starts the processing at that point. In short, the communication initialization apparatus 300 learns from the information held by the setting-regarding information holding means 900 that "an address planned to be assigned to the humidifier is ADD2, and ADD2 is currently a yet-to-set address" and sets the yet-to-set address ADD2 to the humidifier B250 as an official address.

As a result of this, the self-address held by the third attendant-on-equipment information holding means 603 of the humidifier B250 is ADD2, the partner information is ADD1 and the installation place information is "Mr. A's house." Further, the setting-regarding information holding means 900 of the communication initialization apparatus 300 holds the setting-regarding information according to which ADD1 is set to the air conditioner and ADD2 is set to the humidifier. Now that the communication initialization for the air conditioner 100 and the humidifier B250 is completed, the air conditioner 100 and the humidifier B250 can communicate with each other.

The foregoing has described that at the step 706, at least the humidifier B250, which is a terminal to be updated as to the setting-regarding information, voluntarily requests the communication initialization apparatus 300 for transfer of address information about a terminal which is to serve as a partner in communication, and an address transmitted in response to the request is held in the attendant-on-equipment information holding means 603 as new partner information. However, the present invention is not limited to this but is applicable to a configuration in which when setting-regarding information is updated, the communication initialization apparatus voluntarily provides a terminal which is relevant to the update of the setting-regarding information with an address of a terminal which is to serve as a partner in communication, based on the updated setting-regarding information.

Alternatively, the present invention may be applied to a configuration described below, considering a situation where the setting-regarding information holding means 900 holds ADD3 as well as a third address in addition to the self-address, and when a ventilation fan is connected to ADD2 and the humidifier B250 is connected to ADD3, for example, the connection changes partner information held by the air conditioner 100 which is confirmed that there is no change to installation place information. More specifically, at a stage after all necessary changes are made to the installation place information regarding the respective terminals, utilizing the processing at the step 706, in a similar manner to the above, the communication initialization apparatus 300 updates the partner information about the terminal which is confirmed to have no change to the installation place information. Alternatively, in this case, each terminal which is confirmed to have no change to the installation place information may request the communication initialization apparatus 300 for update of the partner information and voluntarily performs the operation for updating the partner information based on the processing at the step 706.

While the foregoing is related to the example where installation place information is not defined, communication initialization is started all over again in a similar sequence when there is equipment whose installation place is different for some reason.

As described above, in the communication system according to the present invention, three addresses in total are necessary considering that the air conditioner, the first humidifier and the second humidifier are each given official addresses. However, even when there are only two yet-to-set addresses held by the communication initialization apparatus, the communication initialization apparatus periodically confirms existence of communication terminals which are already set up and an address of a communication terminal which does not exist is changed to a yet-to-set address, whereby shortage of addresses is avoided.

In addition, even when a communication terminal which is already set up is discarded or the model types are changed, the communication initialization apparatus periodically issues a notice regarding installation place information, compares with the installation place information which is held by the communication terminals and re-executes communication initialization once again when the installation place information compared with each other fail to match with each other (including when there is no installation place information defined from the beginning), whereby the communication system allows communication as before.

Figure 6:
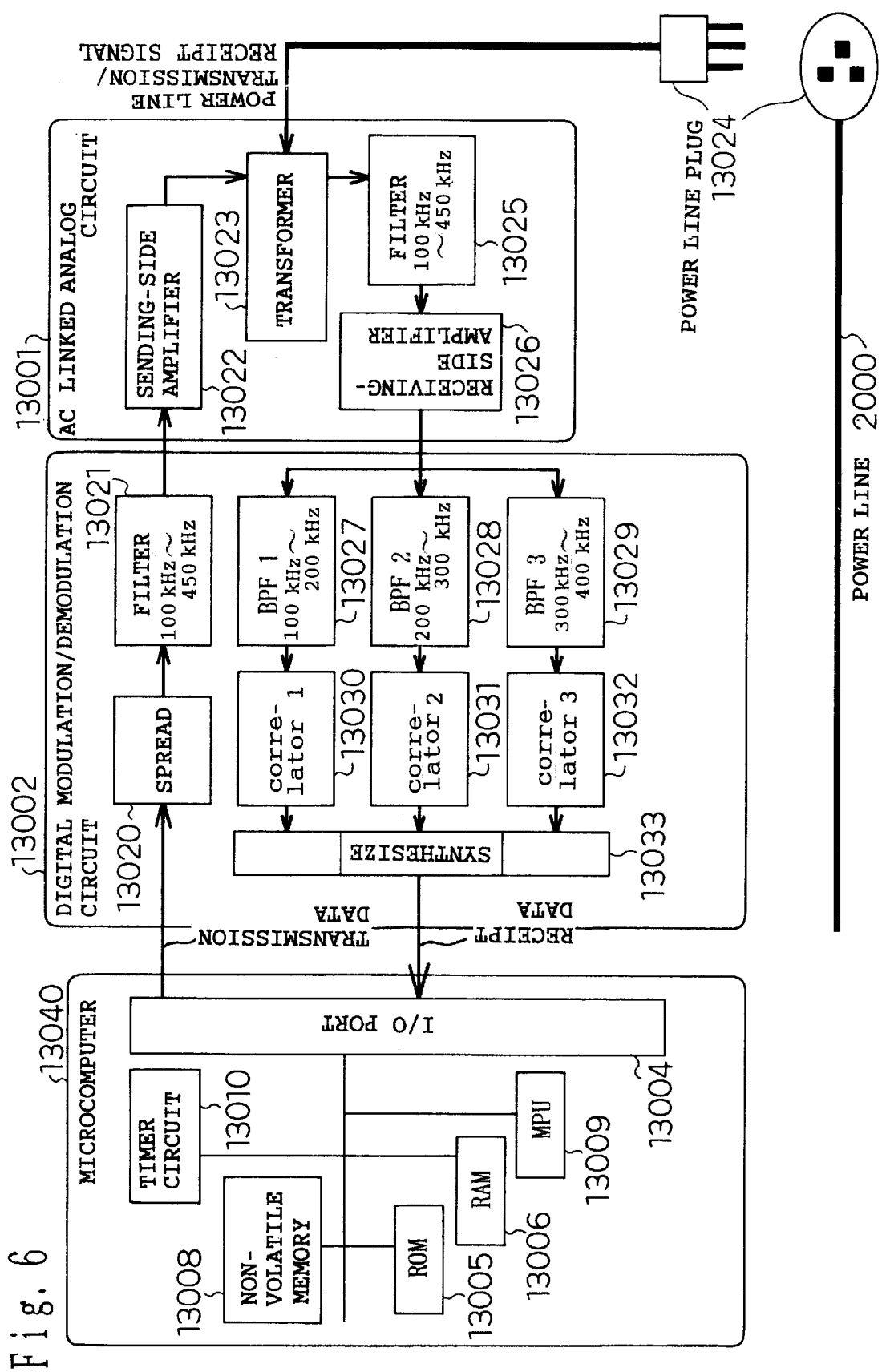
FIG. 6 is a diagram showing an example of a specific structure of the communication system according to the present invention.

FIG. 6 shows an example of a specific structure of the communication initialization apparatus according to another preferred embodiment of the present invention.

The communication initialization apparatus 300, as shown in FIG. 6, comprises a microcomputer 13040, a digital modulation/demodulation circuit 13002 and an AC Linked analog circuit 13001.

In FIG. 6, an electric light wire 2000 which is a transmission medium is shown as an example of the network 40 described above (See FIG. 1). The communication means 50 described earlier (See FIG. 1) comprises the digital modulation/demodulation circuit 13002 which modulates transmission data into a transmission digital signal and demodulates a received digital signal and the AC Linked analog circuit 13001 which converts a digital signal into a transmission/receipt signal on Power line.

The microcomputer 13040 is formed by a timer function 13010 which realizes the timer 700 of the communication initialization apparatus 300 (See FIG. 1), a RAM 1306 and a non-volatile memory 1308 which realize the setting-regarding information holding means 900 (See FIG. 1). The microcomputer 13040 also comprises a ROM 13005 which stores a program for realizing the operation flow of the communication initialization apparatus 300, an MPU (micro processing unit) 13009 which executes the program, and an I/O port 13004 which transfers data which are transmitted and received as the program operates to a digital demodulation part.

The configuration above allows that after a spreading block 13020 spreads the spectrum of transmission data fed to the digital modulation/demodulation circuit 13002 from the I/O port 13004, a filter block 13021 imposes a band-width restriction on the transmission data in a transmission frequency range of 100 kHz to 450 kHz. The transmission data are thereafter amplified by a sending-side amplifier 13022 which is disposed within the AC Linked analog circuit 13001, superimposed over an electric light wire signal by a transformer 13023, and transmitted on Power line 2000.

The receiving side of the signal on Power line 2000 receives the signal through the transformer 13023 which is disposed within the AC Linked analog circuit 13001. After a filter block 13025 imposes a band-width restriction on the signal in a transmission frequency range of 100 kHz to 450 kHz, the signal is amplified by a receiving-side amplifier 13026 and fed to the digital modulation/demodulation circuit 13002. The received spread signal is thereafter processed by a band pass filter 1 (BPF1) 13027 whose range is from 100 kHz to 200 kHz, a band pass filter 2 (BPF2) 13028 whose range is from 200 kHz to 300 kHz, and a band pass filter 3 (BPF3) 13029 whose range is from 300 kHz to 400 kHz, in the respective bandwidths. The spread on the signal is thereafter removed through correlation processing which is performed by a correlator 1 (13030), a correlator 2 (13031) and a correlator 3 (13032), and synthesized into receipt data by a synthesizing block 13033, and then supplied to the microcomputer 13040. This configuration makes it possible to execute the series of operations to be performed by the communication initialization apparatus 300.

All or some of the means according to any one the preferred embodiments of the present invention described above are program storage media which record a program and/or data for executing all or some of the functions described above using a computer. Storage media such as a magnetic disk and an optical disk may be manufactured as program storage media which can be read by a computer, so that the program and/or data read by the computer operate in cooperation with the computer using the storage media and accordingly execute the functions. This creates a similar effect to the effect described above.

Further, although the foregoing has described that the network 40 is realized by a wire such as an electric light wire in the preferred embodiment above, this is not limiting. Of course, the network 40 may be realized alternatively by radio, for instance.

As clearly described above, according to the present invention, even when the types or the number of communication terminals which are connected on a network is changed, initial communication setting is updated, and therefore, it is possible to always ensure communication between the terminals.

The present invention, as clearly described above, is advantageous in that it is possible to efficiently assign addresses to the terminals.

Further, even when connection regarding the terminals or the terminals themselves is changed, it is advantageously possible to ensure communication between the terminals.

What is claimed is:

1. In a network having a plurality of electrical appliances communicating with an initialization terminal, each appliance storing at least (a) an installation place address which identifies a location of each appliance and (b) a terminal address which uniquely identifies each appliance, a method for initializing an appliance in the plurality of appliances on the network, comprising the steps of:

(a) storing in the initialization terminal a designated installation place address and an official terminal address of the appliance;

(b) sending from the initialization terminal to the appliance the designated installation place address;

(c) receiving and matching the designated installation place address sent from the initialization terminal with the installation place address stored in the (d) changing the installation place address stored in the appliance to the designated installation place address received from the initialization terminal sent in step (b), if a match is not present in step (c);

(e) requesting, by the appliance, the initialization terminal to send the official terminal address to the appliance, in response to changing the installation place address stored in the appliance in step (d);

(f) sending from the initialization terminal to the appliance the official terminal address in response to the request in step (e); and (g) replacing the stored terminal address in the appliance with the official terminal address received from the initialization terminal.

2. The method of claim 1, wherein each appliance further includes storing equipment type for identifying the type of appliance, the method including the steps of:

(h) storing in the initialization terminal the equipment type of the appliance;

(i) sending from the initialization terminal to the appliance the designated installation place address and the official terminal address of the appliance, at predetermined intervals, to determine existence of the appliance;

(j) waiting for a response from the appliance;

(k) repeating step (i), if the appliance responds with a message including the equipment type stored in the appliance and if the equipment type stored in the appliance matches the equipment type stored in the initialization terminal; and (l) changing the stored official address associated with the appliance in the initialization terminal, if a match is not present in step (k).

3. A communication system comprising:

a bus for transmission of data;

a plurality of terminals which are connected to said bus and include inherent-in-equipment information containing equipment type information; and communication initialization means which sets up addresses of said plurality of terminals via said bus, wherein said communication initialization means comprises:

setting-regarding information holding part which holds setting-regarding information which contains information associating said addresses with said equipment type information and information indicative of whether said addresses are used or not;

first setting-regarding information updating means which, upon receipt of address setting request from a terminal of said terminals and in the case that an address is not used in setting-regarding information which has the same equipment type information as said equipment type information of said terminal, updates said setting-regarding information by associating said address as used address of said terminal; and second setting-regarding information updating means which determines, at predetermined time intervals, whether said terminals associated with said used address contained in said setting-regarding information are connected to said bus or not, and in the case that said terminals associated with said used address is found unconnected to said bus, updates said setting-regarding information by setting up said used address as unused address.

4. The communication system of claim 3, wherein said terminals comprise attendant-on-equipment information holding means which hold installation place information which is indicative of the installation places of said terminals, said communication initialization means transmits installation place information regarding each one of said terminals to each one of said terminals at said predetermined time intervals, and each one of said terminals compares said installation place information held in said attendant-on-equipment information holding means with thus received installation place information, and in the event that these installation place information fail to match, stores the received installation place information in said attendant-on-equipment information holding means as new installation place information.

5. The communication system of claim 3, wherein said setting-regarding information holding part further holds an address of a terminal which is to serve as a communication partner, and those terminals with at least said setting-regarding information updated by said communication initialization means comprise attendant-on-equipment information holding means which makes a request to said communication initialization means to transfer an address of a communication partner held in said setting-regarding information holding part and holds an address transferred in accordance with said request as the address of the communication partner.

6. The communication system of claim 3, wherein said setting-regarding information holding part further holds an address of a terminal which is to serve as a communication partner, and in response to updating of said setting-regarding information in said communication initialization means, said communication initialization means transfers an address of such a terminal whose said setting-regarding information was updated to a communication partner which is held in said setting-regarding information holding part.

7. A communication initialization apparatus, used in a communication system for communications between a plurality of terminals which are connected to said bus for transmission of data and include inherent-in-equipment information containing equipment type information, for setting up addresses of said plurality of terminals via said bus, comprising;

setting-regarding information holding part which holds setting-regarding information which contains information associating said addresses with said equipment type information and information indicative of whether said addresses are used or not;

first setting-regarding information updating means which, upon receipt of address setting request from a terminal of said terminals and in the case that an address is not used in setting-regarding information which has the same equipment type information as said equipment type information of said terminals, updates said setting-regarding information by associating said address as used address of said terminal; and second setting-regarding information updating means which determines, at predetermined time intervals, whether said terminals associated with said used address contained in said setting-regarding information are connected to said bus nor not, and in the case that said terminals associated with said used address is found unconnected to said bus, updates said setting-regarding information by setting up said used address as unused address.

8. An address setting method, used in a communication system for communications between a plurality of terminals which are connected to said bus for transmission of data and include inherent-in-equipment information containing equipment type information, for setting up addresses of said plurality of terminals via said bus, comprising:

a step of holding setting-regarding information which contains information associating said addresses with said equipment type information and information indicative of whether said addresses are used or not;

a step of, upon receipt of address setting request from a terminal of said terminals and in the case that an address is not used in setting-regarding information which has the same equipment type information as said equipment type information of said terminal, updating said setting-regarding information by associating said address as used address of said terminal;

a step of determining at predetermined time intervals whether said terminals associated with said used address contained in said setting-regarding information are connected to said bus or not; and a step of, in the case that said terminals associated with said used address is found unconnected to said bus, updating said setting-regarding information by setting up said used address as unused address.

9. A program for making a computer execute the steps of the address setting method of claim 8.

10. A recording medium which holds the program of claim 9 and which can be processed on a computer.

* * * * *

UNITED STATES PATENT AND TRADEMARK OFFICE
CERTIFICATE OF CORRECTION

PATENT NO. : 6,701,430 B1
DATED : March 2, 2004
INVENTOR(S) : Koji Iwamoto

Page 1 of 1

It is certified that error appears in the above-identified patent and that said Letters Patent is hereby corrected as shown below:

Title page,
Item [54], Title "COMMUNICATION SYSTEM, COMMUNICATION INITIALIZATION APPARATUS AND PROGRAM STORAGE MEDIUM" should read -- SYSTEM WITH COMMUNICATION SEQUENCE FOR INITIALIZING GROUP AND NETWORK ADDRESSES OF APPLIANCES AND WITH RECYCLING OF PREVIOUSLY USED ADDRESSES FOR SAME TYPE EQUIPMENT --
Item [56], References Cited, U.S. PATENT DOCUMENTS, please add
-- 6,105,100    8/2000  Dean et al.
   5,708,655    1/1998  Toth et al.
   5,603,225    2/1997  Tobi et al. --

Column 15,
Line 19, insert -- appliance; -- after "the"

Signed and Sealed this

Tenth Day of August, 2004

JON W. DUDAS
*Acting Director of the United States Patent and Trademark Office*